United States Patent [19]

Greenwood et al.

[11] Patent Number: 4,767,459
[45] Date of Patent: Aug. 30, 1988

[54] INK

[75] Inventors: David Greenwood, Oldham; John E. Presgrave, Bacup, both of United Kingdom

[73] Assignee: Imperial Chemical Industries PLC, London, England

[21] Appl. No.: 97,176

[22] Filed: Sep. 16, 1987

[30] Foreign Application Priority Data

Oct. 10, 1986 [GB] United Kingdom ............... 8624370

[51] Int. Cl.$^4$ .......................................... C09D 11/02
[52] U.S. Cl. ..................................... 106/22; 534/815
[58] Field of Search ................... 106/20, 22; 534/815, 534/809

[56] References Cited

FOREIGN PATENT DOCUMENTS 3529495  2/1987  Fed. Rep. of Germany .

Primary Examiner—Amelia Burgess Yarbrough
Attorney, Agent, or Firm—Cushman, Darby & Cushman

[57] ABSTRACT

An ink for ink-jet printing comprising a solution of C.I. Direct Black 168.

6 Claims, 1 Drawing Sheet

U.S. Patent  Aug. 30, 1988  4,767,459

INK

This invention relates to an ink suitable for use in ink-jet printing.

In ink-jet printing, droplets of ink are generated in various ways and deposited on a substrate to effect a record. A suitable ink comprises, as essential components, a recording agent (usually a dye or a pigment) and a liquid vehicle (usually water, an organic solvent or mixtures thereof) and, as optional components, various other additives.

Ink-jet printing may be classified into various systems depending on the method for generation of ink droplets and the method for controlling the flight direction of ink droplets. An example of a device in accordance with one system is shown in FIG. 1.

Figure 1:
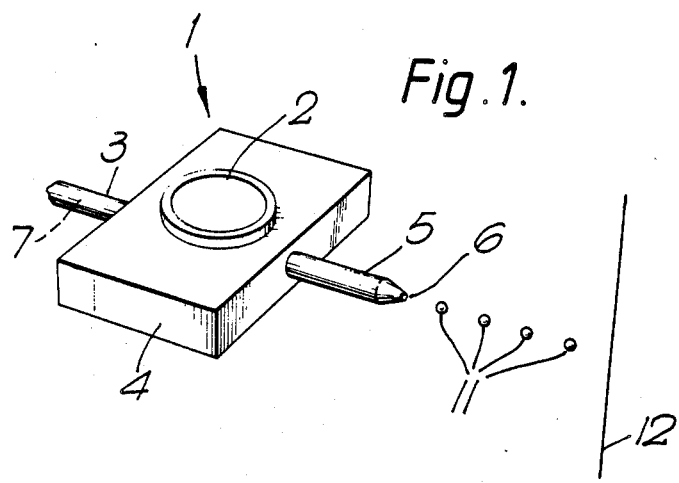

The device shown in FIG. 1 operates by providing a printing signal at the print head section having a piezoelectric oscillator and generating ink droplets corresponding to said signal. In FIG. 1, a print head 1, comprises a piezo-oscillator 2, an inlet line 3 for ink, a liquid chamber 4, and an outlet line 5 leading to a nozzle 6 directed at a substrate 12. Ink 7 is introduced into the liquid chamber 4, through inlet 3 and fills the chamber 4 and the outlet line up to the nozzle 6. A pulsed electrical signal derived from a pattern information signal is applied to the piezo-electric oscillator 2 which transforms the pulsed electrical signal into pressure pulses and applies these to the ink 7 in the liquid chamber 4. As a result, the ink 7 is discharged as droplets 11 through the nozzle 6 thereby to effect recording on the surface of the substrate 12.

Figure 2:
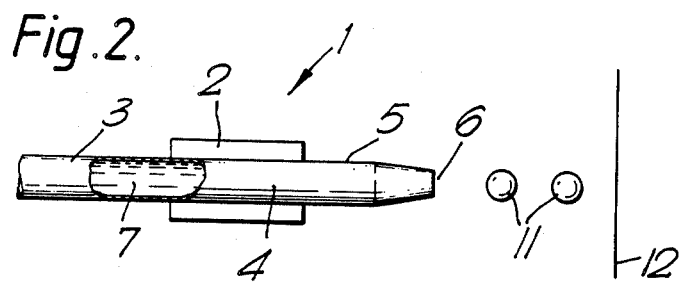

An example of another type of device using the same system is shown in FIG. 2, in which a tubular liquid chamber 4 links the inlet and outlet lines 3, 5 and a cylindrical piezoelectric oscillator 2 is arranged around the outer peripheral portion of the chamber 4. The mechanism for generation of ink droplets is essentially the same as in the device as shown in FIG. 1.

In another system, charged droplets are continuously generated but only a proportion of the droplets are selected for recording.

Figure 3:
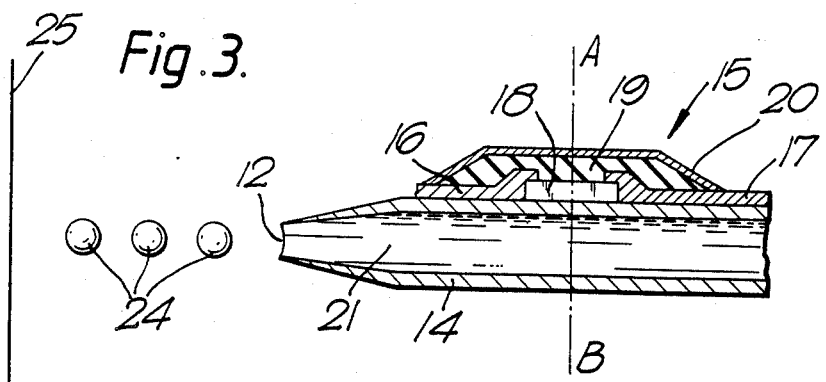
Figure 4:
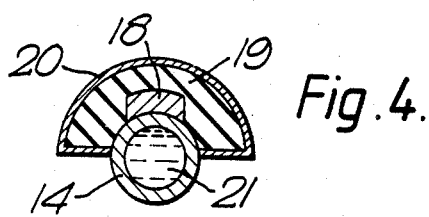

In yet another system, heat energy corresponding to the pattern information signal is imparted to the ink in the chamber of print head, and liquid droplets are formed by said energy. An embodiment of such a device is shown in FIGS. 3 and 4. FIG. 3 is a cross-sectional view along the length of a tube 14 in a print head 13 and FIG. 4 is a cross-sectional view taken on the line A-B in FIG. 3.

In FIGS. 3 and 4 a print head 13, for heat sensitive recording by the deposit of droplets 24 of ink 21 on a substrate 25, comprises a thin-walled tube 14 terminating at a nozzle 12 carrying a heat generator 15. The heat generator 15 comprises a pair of spaced aluminium electrodes 16, 17, defining a gap occupied by a nichrome heating resistor 18 the ends of the electrodes 16, 17 and the resistor 18 being encased in a layer of insulant 19 and a protective envelope 20.

In operation an ink 21 is fed into the right hand end of the tube 14 under slight pressure and forms a meniscus at the nozzle 12.

The application of a pulsed electric signal, derived from a pattern information signal, across the electrodes 16, 17, generates pulses of heat in the resistor 18 which are transferred across the wall of the tube and cause the formation of bubbles in the ink 21 adjacent to the resistor 18. The excess pressure developed by the bubbles causes discharge of the ink 21 from the nozzle 12 in the form of small droplets 24, each corresponding to a electric pulse, directed at the substrate 25.

As ink-jet printing generates little noise and allows high speed multi-colour operation without the need for special dye fixation treatments, a number of different ink-jet printing systems are currently being intensively investigated.

An ink for any of the various types of ink-jet printing systems needs to meet the following criteria:

(1) Physical properties of the ink, such as viscosity and surface tension, are each within a defined range.
(2) All solutes have good solubility in the ink medium to give solutions having good stability which do not plug the fine ejecting orifices (hereinafter referred to as "solution stability").
(3) The recording agent gives images of sufficient optical density.
(4) The ink does not change in physical properties or deposit solid matter during storage.
(5) Printing can be performed without a restriction on the nature of substrate on which a record is made.
(6) The ink exhibits a high rate of fixation.
(7) The ink gives images of good resolution and having good resistance to water, solvent (particularly alcohol), light, weather and abrasion.

However, images produced by conventional inks, particularly water-based inks, tend to form blots, dislocations or scratches, or to fade by water adhesion, mechanical friction, or exposure to light and an ink free from these drawbacks is an urgent requirement.

In addition to the above criteria, an ink for use in an ink jet printing process using heat energy, must also have excellent heat stability. The ink, if thermally unstable, is liable to undergo chemical change because it is exposed to a high temperature during repetition of the generation and extinction of bubbles by heating, with the result that insoluble matter forms and deposits on the wall of the heating zone of the recording head, which, in turn, renders the recording head to be eventually incapable of discharging the liquid therethrough. Accordingly, the thermal stability of the ink is very important for continuous high-speed record over a long period of time.

Although a number of inks have been proposed to overcome these problems, none have been produced which meet all the foregoing requirements.

It has now been found that inks containing the hereinafter defined water-soluble trisazo dye are extremely useful in ink-jet printing systems and meet substantially all of the criteria associated with such systems.

Thus, according to the invention, there is provided an ink comprising the water-soluble dye which, in the form of the free acid, has the formula:

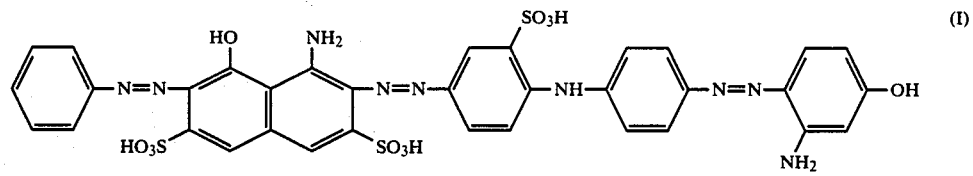

The dye of Formula I, known as C.I. Direct Black 168, is a commercially available product and whilst it has been shown in the form of the free acid, it will commonly be used in the form of a water soluble salt, for example a sodium, lithium or other alkali metal salt or an amine salt.

It is possible, by use of a dye in accordance with Formula I to obtain an ink having an improved solution stability, particularly during a prolonged storage in concentrated form, and having excellent recording properties, particularly ejection stability, ejection responsiveness, and continuous recording workability.

The present ink is of practical importance and gives images having good water resistance, alcohol resistance and light resistance.

The present ink preferably comprises the dye and a liquid medium, such as water, an organic solvent or a mixture thereof. The dye has especially good solution stability in the above-mentioned liquid medium, thereby improving the ejection stability of the ink and reducing the incidence of plugging of the ejecting orifice even after a long period of storage in the recording apparatus.

The amount of the dye in the ink is determined in accordance with the desired optical density of the image, the type of recording device to be used, other components to be added, the required physical properties of ink, etc. But generally speaking, a suitable dye content is in the range of 0.5-20%, preferably 0.5-15%, and especially 1-10%, by weight based on the total weight of the ink.

The present ink can contain, besides the hereinbefore defined dye of Formula I, other dyes selected from various types of known dyes such as direct dyes, acid dyes, and the like but preferably contains only the dye of Formula I or dyes having similar performance characteristics in ink jet printing.

Liquid media used for preparing the present ink include water and mixtures of water with various water-soluble organic solvents. The water-soluble organic solvents include $C_1-C_4$ alkanols such as methanol, ethanol, n-propanol, isopropanol, n-butanol, sec-butanol, tert-butanol, isobutanol; amides such as dimethylformamide and dimethylacetamide; ketones or ketone alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazol-idinone; polyalkylene glycols such as polyethylene glycol and polypropylene glycol; alkylene glycols and thioglycols containing $C_2-C_6$ alkylene groups such as ethylene glycol, propylene glycol, butylene glycol, triethylene glycol; thiodiglycol, hexylene glycol, and diethylene glycol; other polyols such as glycerol, 1,2,6-hexanetriol; and lower alkyl ethers of polyhydric alcohols such as 2-methoxyethanol, 2-(2-methoxyethoxy)ethanol, 2-(2-ethoxyethoxy)ethanol and 2-[2-(2-methoxyethoxy)ethoxy]ethanol, 2-[2-(2-ethoxyethoxy)ethoxy]-ethanol.

Preferred water-soluble organic solvents among these are glycols and glycol ethers, such as ethylene glycol, diethylene glycol, triethylene glycol and 2-methoxy-2-ethoxy-2-ethoxyethanol; polyethylene glycols with molecular weights up to 500; and heterocyclic ketones such as N-methylpyrrolidone and 1,3-dimethyl-2-imidazolidinone. Preferred specific solvent mixtures are a binary mixture of water and diethylene glycol and a tertiary mixture of water, diethylene glycol and N-methyl-pyrrolidone.

The present ink preferably contains from 5-95%, preferably 10-80%, and especially 20-50%, by weight of water-soluble organic solvent based on the total weight of the ink.

The present ink, prepared from the components mentioned above, is generally characterised by excellent and balanced recording performance characteristics i.e. signal responsiveness, stability for producing droplets, ejection stability, long-term continuous recording workability, and ejection stability after a long rest. It also generally exhibits good preservation stability, solution stability, fixation on the recording substrate and resistance of the recorded image to water, alcohol, light and weather. However, miscellaneous known additives may also be incorporated into the present ink for further improvement of these characteristics. Examples of suitable additives are viscosity modifiers, such as poly(vinyl alcohol), cellulose derivatives, and other water-soluble resins; various kinds of surfactants, i.e. cationic, anionic, and nonionic; surface tension modifiers, such as diethanolamine and triethanolamine; and pH conditioners, such as buffers.

Inks for use in ink-jet recording of the type based on the application of a charge to the ink droplets usually contain an inorganic salt, such as lithium chloride, ammonium chloride or sodium chloride as a resistivity modifier. Urea or thiourea may also be added to improve the water-retentivity of the ink at the tip of the ejecting orifice. When the present ink is used for ink-jet recording of the type based on the action of thermal energy, the thermal properties, e.g. specific heat, coefficient of thermal expansion, and heat conductivity, of the ink may be modified by suitable additives.

The present ink represents a significant step towards satisfying all the requirements stated above, that is to say, to providing an ink which does not plug capillary tubes or ejecting orifices, does not result in deterioration or formation of precipitate during storage, is excellent in recording workability, particularly ejection ability and ejection responsiveness; and gives such good quality images as to be excellent in colour density, shade, and contrast and have good resistance to water, solvent, light weather, and abrasion and excellent fixing properties.

Furthermore, the present ink is particularly suitable for use in an ink jet recording process utilising thermal energy because of its good long term heat stability.

The present invention is further illustrated with reference to the following Examples in which all parts and percentages are by weight unless otherwise indicated.

EXAMPLE 1

An ink is prepared comprising 3 parts of the dye of Formula I, 60 parts of water and 40 parts of diethylene glycol.

The ink provides images having good colour, light fastness and water resistance.

EXAMPLE 2

Inks are prepared by dissolving the dye of Formula I in various typical ink solvents. The solubility of the dye in these solvents is as follows:

| | |
|---|---|
| Water (8) | |
| Diethylene glycol (1) | >20% |
| N—methylpyrrolidone (1) | |
| Diethylene glycol | 10–15% |
| n-Propanol | 5–10% |
| Dipropylene glycol | |
| 2-(2-Ethoxyethoxy)ethanol | <5% |

EXAMPLE 3

The properties of images obtained from 5% solutions of the dye of Formula I in an 8/1/1 mixture of water/diethylene glycol/Nmethyl pyrrolidone (Ink A) and 100% diethylene glycol (Ink B) are as follows:

| | Shade | Wet fastness | Light fastness |
|---|---|---|---|
| Ink A | Neutral | 4–5 | 3–4 |
| Ink B | Neutral to blue | 5 | 3 |

The inks show excellent build up of colour density.

We claim:

1. An ink comprising the water-soluble dye which, in the form of the free acid, has the formula:

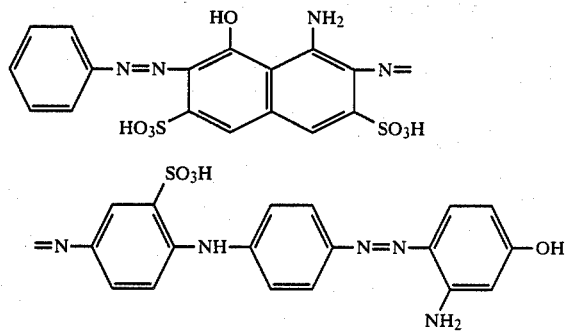

2. An ink according to claim 1 comprising a solution of the dye in a water-soluble organic solvent or a mixture of the solvent and water.

3. An ink according to claim 2 wherein the organic solvent is a glycol or a nitrogen-containing heterocyclic ketone.

4. An ink according to claim 3 wherein the glycol is diethylene glycol.

5. An ink according to claim 3 wherein the heterocyclic ketone is N-methylpyrrolidone.

6. A method of printing which comprises ejecting an ink in accordance with any one of claims 1 to 5 from a small orifice in the form of droplets directed towards a substrate on which an image is to be formed.